United States Patent
Ross

(10) Patent No.: US 8,905,827 B1
(45) Date of Patent: Dec. 9, 2014

(54) DEHIDER TOOL AND BLADE THEREFOR

(71) Applicant: Dale R. Ross, McPherson, KS (US)

(72) Inventor: Dale R. Ross, McPherson, KS (US)

( * ) Notice: Subject to any disclaimer, the term of this patent is extended or adjusted under 35 U.S.C. 154(b) by 0 days.

(21) Appl. No.: 14/214,194

(22) Filed: Mar. 14, 2014

Related U.S. Application Data

(60) Provisional application No. 61/782,839, filed on Mar. 14, 2013.

(51) Int. Cl.
*A22C 25/17* (2006.01)
*A22B 5/16* (2006.01)

(52) U.S. Cl.
CPC ............... *A22B 5/168* (2013.01); *A22B 5/163* (2013.01)
USPC .......................................................... 452/133

(58) Field of Classification Search
CPC ...... A22B 5/163; A22B 5/165; B26B 25/002; B26B 25/00; B26D 1/006; B26D 1/44; B26D 2001/0046; B26D 2001/006; B26D 3/28
USPC .................. 452/132, 133, 125, 111, 137, 149
See application file for complete search history.

(56) References Cited

U.S. PATENT DOCUMENTS

| | | | |
|---|---|---|---|
| 2,937,400 A * | 5/1960 | Swartzentruber | 452/133 |
| 4,215,451 A | 8/1980 | Wikoff | |
| 4,368,560 A | 1/1983 | Wetzel et al. | |
| 5,122,092 A | 6/1992 | Abdul | |
| 5,441,445 A * | 8/1995 | Karubian et al. | 452/133 |
| 5,445,561 A * | 8/1995 | Elmer | 452/133 |
| 5,551,156 A * | 9/1996 | Elmer | 30/276 |
| 5,813,904 A * | 9/1998 | Aslanis et al. | 452/133 |
| 6,604,288 B2 * | 8/2003 | Whited et al. | 30/276 |
| 6,938,348 B2 * | 9/2005 | Roncaglia | 30/276 |
| 8,047,901 B2 * | 11/2011 | Gwyther | 452/133 |
| 8,448,340 B2 * | 5/2013 | Whited | 30/276 |
| 8,671,580 B2 * | 3/2014 | Whited | 30/276 |

* cited by examiner

*Primary Examiner* — Richard Price, Jr.
(74) *Attorney, Agent, or Firm* — Jeffrey L. Thompson; Thompson & Thompson, P.A.

(57) ABSTRACT

A dehider tool has first and second blades arranged in contact with each other that rotate in opposite directions on a common blade axis. A drive assembly having a pneumatic motor and respective drive belts drives the blades in opposite directions about the common blade axis. The blades each have an outer cutting edge in the shape of a regular convex polygon, such as a decagon. The blades have an inner opening for coupling with a blade holder of the drive assembly. The inner opening has the shape of a regular convex polygon, such as a pentagon. The blades are covered with a hard surface coating to extend their service life.

22 Claims, 4 Drawing Sheets

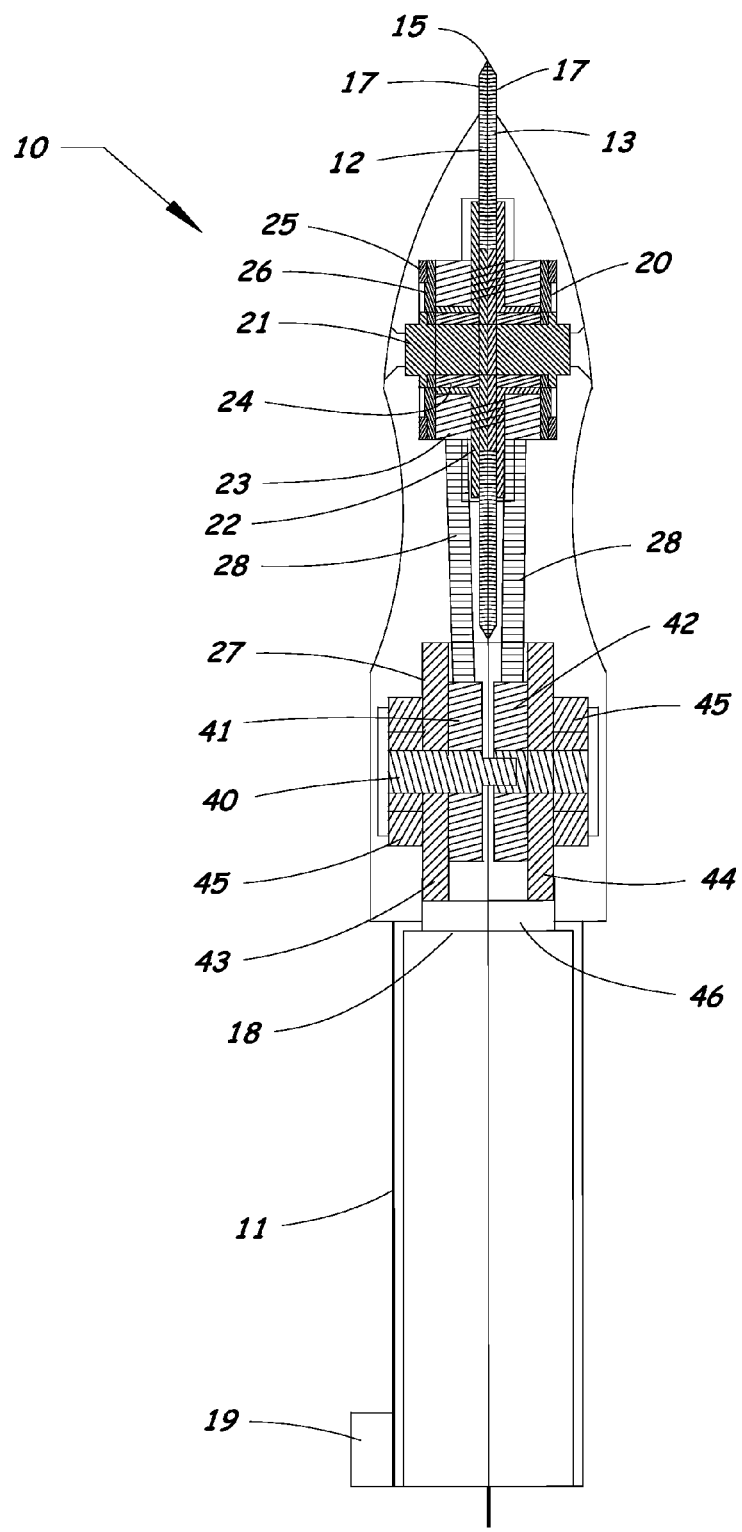

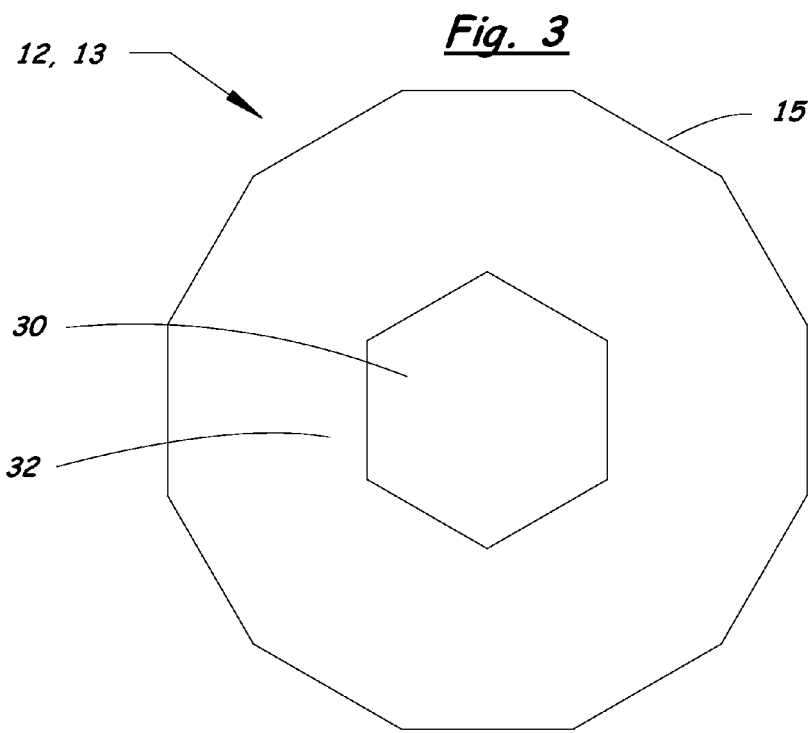
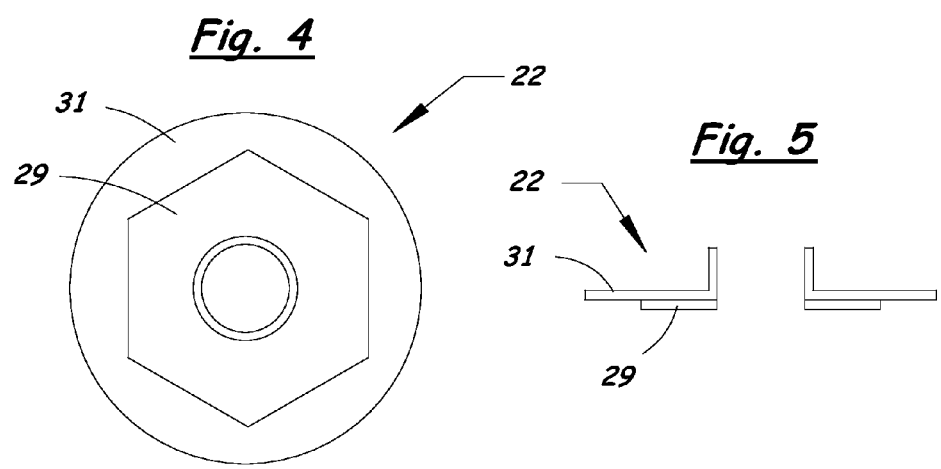

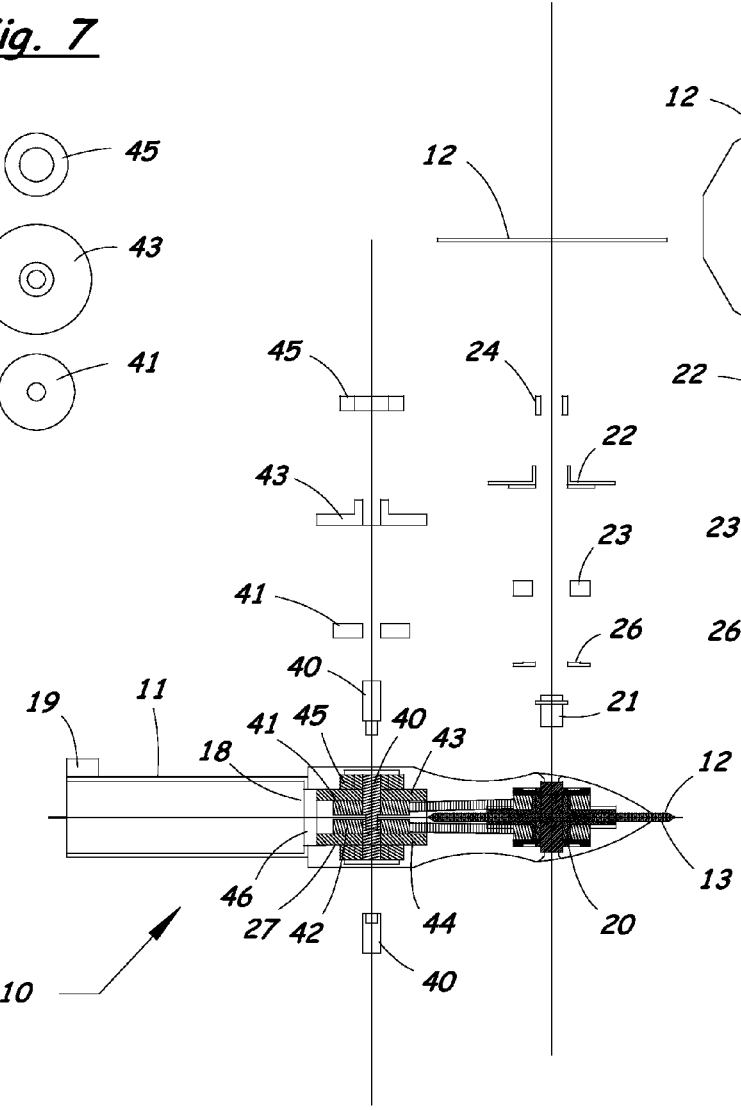

DEHIDER TOOL AND BLADE THEREFOR

RELATED APPLICATIONS

This application claims the benefit of U.S. Provisional Patent Application No. 61/782,839 filed on Mar. 14, 2013. The entire content of the priority application is incorporated herein by reference.

BACKGROUND OF THE INVENTION

1. Field of the Invention

The present invention relates generally to handheld dehiders and powered skinning knives used to remove the hide of a carcass in a meat processing facility. More particularly, the present invention relates to dehiders that use a pair of blades that are rotatably driven in opposite directions on a common blade axis.

2. Description of the Related Art

Handheld dehider tools are commonly used in meat processing facilities to remove the hide from an animal carcass. A common type of dehider tool includes a pair of adjacent cutting blades that are driven in opposed cutting oscillations about a common blade axis by a pneumatic motor and drive mechanism. The cutting blades each have teeth around an outer perimeter. As the blades oscillate, the teeth on one blade move past the teeth on the adjacent and oppositely moving blade. This produces a shearing and cutting action for removing the hide from the carcass. Examples of such dehider tools can be found in U.S. Pat. Nos. 4,368,560, 5,122,092, and 8,047,901.

Another dehider tool is disclosed in U.S. Pat. No. 4,215,451, which includes a pair of adjacent cutting blades rotatably driven in opposed cutting rotations about a common blade axis by a pneumatic motor and drive mechanism. The cutting blades in the '451 patent have teeth around an outer perimeter. As the blades rotate in opposite directions, the teeth on one blade move past the teeth on the adjacent and oppositely moving blade to produce a shearing and cutting action.

Exising dehider tools suffer from poor hand-tool performance and unsatisfactory interchangeable parts. The toothed cutting blades also suffer from a loss of energy through harmonic vibration and friction, particularly at high operating speeds. This reduces the value of the workforce and may create health concerns for the person performing the task.

There is a need in the industry for an improved handheld dehider tool and blades therefor that overcome the problems with the prior art mentioned above.

SUMMARY OF THE INVENTION

An object of the present invention is to provide a handheld dehider tool that operates with less vibration and that can be comfortably used for long periods of time.

A further object of the present invention is to provide blades for a handheld dehider tool that result in less vibration and provide a more effective cutting action with a longer operating life than conventional dehider tools.

To accomplish these and other objects of the present invention, a dehider tool has first and second blades arranged in contact with each other that rotate in opposite directions on a common blade axis. A drive assembly having a pneumatic motor and respective drive belts drives the blades in opposite directions about the common blade axis. The blades each have an outer cutting edge in the shape of a regular convex polygon, such as a decagon. The blades have an inner opening for coupling with a blade holder of the drive assembly. The inner opening has the shape of a regular convex polygon, such as a pentagon. The blades are covered with a hard surface coating to extend their service life.

According to one aspect of the present invention, a dehider tool is provided comprising: first and second blades arranged to be in contact with each other, the blades being movable relative to each other on a common blade axis; a drive assembly for causing the blades to move relative to each other about the common blade axis; and at least one of the blades having a shape of a regular convex polygon.

According to another aspect of the present invention, a blade is provided for a dehider tool, comprising: a planar structure having a shape of a regular convex polygon with a plurality of outer sides, the outer sides each comprising a sharp edge.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 2 is a cross section side view of the dehider tool.

FIG. 3 is a plan view of a blade for the dehider tool.

FIG. 4 is a plan view of a blade holder used in the dehider tool.

FIG. 5 is a side view of the blade holder.

FIG. 6 is an exploded side view showing the various parts of a drive assembly and blade assembly of the dehider tool.

FIG. 7 is a plan view of the parts of the drive assembly of the dehider tool.

FIG. 8 is a plan view of the parts of the blade assembly of the dehider tool.

DETAILED DESCRIPTION OF THE INVENTION

Figure 1:
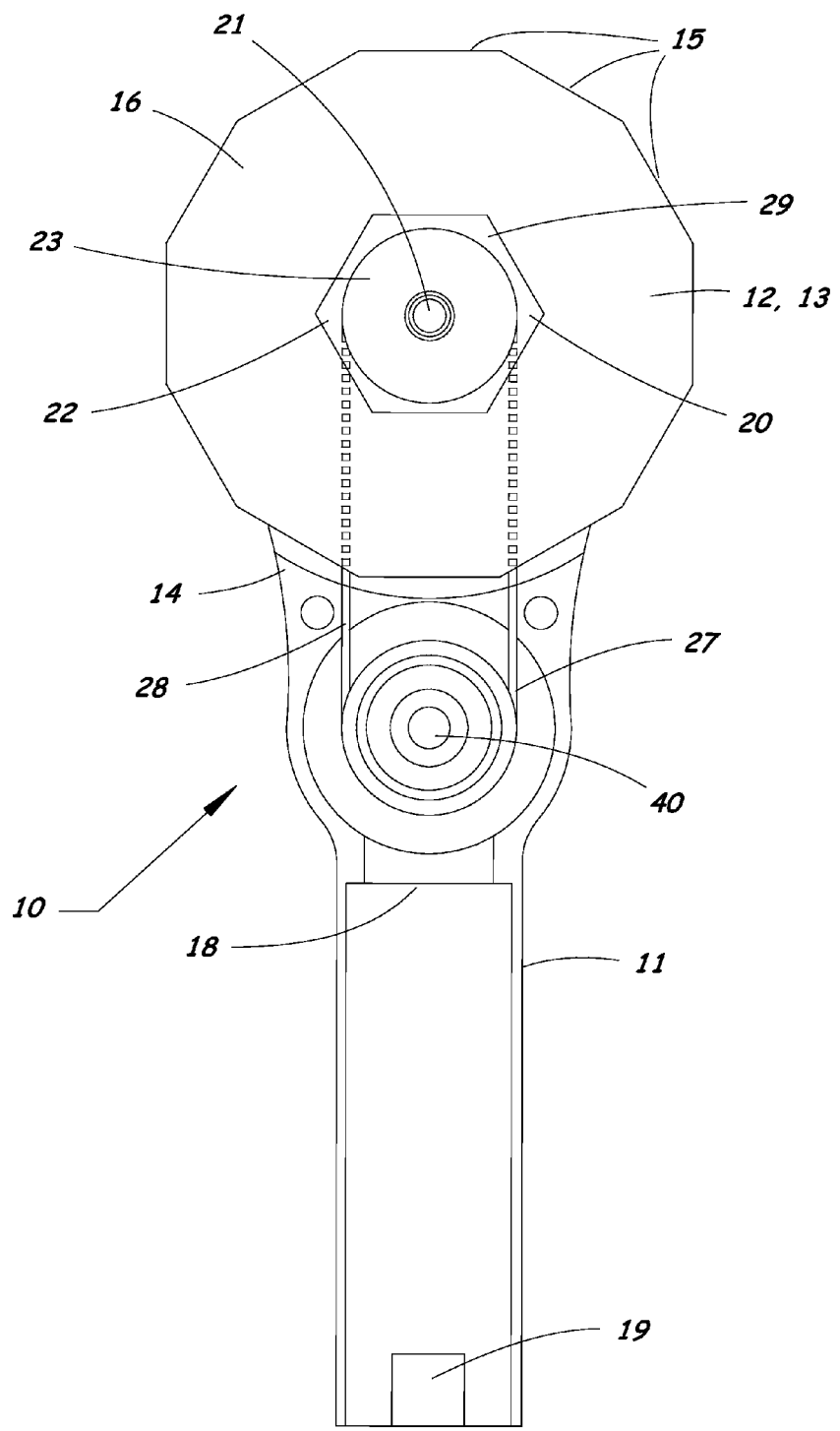
FIG. 1 is a cross section plan view of a handheld dehider tool according to the present invention.

A dehider tool according to the present invention will be described in detail with reference to FIGS. 1 to 8 of the accompanying drawings.

The dehider tool 10 of the present invention includes a housing 11 having a shape that can be gripped comfortably by a human hand, and a pair of adjacent blades 12, 13 that are arranged in contact with each other and protrude out of a distal end 14 of the housing 11.

The blades 12, 13 each have a shape of a regular convex polygon. A regular convex polygon is a polygon that is equiangular and equilateral and that has sides extending between adjacent outer vertices. A regular convex polygon, as used in the present application, does not include a star polygon. In the illustrated embodiment, the blades 12, 13 each have the shape of a 10-sided regular convex polygon, also known as a decagon. However, it is contemplated that a blade having fewer or more than 10 sides could also be used. The preferred embodiment is a blade shaped as a regular convex polygon having at least five sides.

The blades 12, 13 each have a plurality of outer sides 15 comprising sharp edges that define a continuous cutting edge extending around an outer periphery of each blade 12, 13. The blades 12, 13 each have first and second planar sides 16, 17. The first planar side 16 is a flat surface adapted to be engaged by a corresponding flat surface of the other blade. The outer sides 15 of the blades 12, 13 are beveled on the second planar side 17 to form the sharp edges around the outer periphery of the blades 12, 13. The blades 12, 13 are substantially identical in size and shape, which will reduce parts inventory and minimize vibrations during use.

A pneumatic motor 18 is contained within the housing 11 for driving the blades 12, 13. A trigger 19 or other suitable device is mounted on the housing 11 for manipulation by the user to control the flow of compressed air to the motor 18 during operation of the tool 10.

The blades 12, 13 are supported within the housing 11 by a blade mounting assembly 20. The mounting assembly 20 includes for each blade 12, 13 a support spindle 21, a blade holder 22, and a belt pulley 23. The belt pulley 23 is secured onto or integral with the blade holder 22 so that the blade holder 22 rotates with the belt pulley 23. A needle bearing 24 is provided between the blade holder 22 and the support spindle 21 to allow the blade holder 22 to rotate freely on the support spindle 21. A spring washer 25 and thrust bearing 26 are provided between the housing 11 and the blade holder 22 and belt pulley 23 to allow an axial force to be applied to maintain the blades 12, 13 in close contact with each other.

A drive assembly 27 for each blade 12, 13 includes an endless belt 28 that couples the pneumatic motor 18 with the belt pulley 23. The belt 28 can be, for example, a timing belt with cogs that engage and mate with corresponding grooves on the belt pulley 23. The drive assembly 27 is arranged to drive the blades 12, 13 in opposite directions relative to each other.

The drive assembly 27 also includes a two-part pivot pin 40, right and left drive pulleys 41, 42 rotatably mounted on the pivot pin 40, right and left drive gears 43, 44 attached to the drive pulleys 41, 42, and bushings 45. The right and left drive gears 43, 44 are engaged and driven by a motor gear 46 associated with the pneumatic motor 18.

The blade holder 22 for each blade 12, 13 has a first portion 29 that fits into a center opening 30 of the blade 12, 13, and a second portion 31 that engages a flat surface 32 of the blade 12, 13 adjacent to and surrounding the center opening 30. The center opening 30 of each blade 12, 13 has a shape that matches the shape of the external periphery of the first portion 29 of the blade holder 22. In the illustrated embodiment, the center opening 30 has the shape of a regular pentagon. However, the center opening 30 may have other shapes, such as various other regular convex polygon shapes. The center opening 30 preferably has the shape of a regular convex polygon with at least five sides.

The blades 12, 13 are preferably covered by a hard surface coating to improve their service life. In one embodiment, the blades 12, 13 are covered by a hard chrome coating. The hard surface coating can be applied, for example, using a known technique, such as electrolysis plating.

In use, the user will activate the pneumatic motor 18 using the trigger 19 attached to the housing 11. The pneumatic motor 18 will cause the first and second blades 12, 13 to rotate in opposite directions relative to each other at a high speed (e.g., about 4,000 rpm), creating a smooth slicing action at the exposed peripheries of the blades 12, 13. The configurations of the blades 12, 13 and the use of a belt drive assembly 27 in the present invention will provide a substantial reduction in the amount of vibration imparted on the user, and will provide a longer lasting tool 10 with reduced parts wear and time and material savings over the prior art.

Although the invention has been described in connection with a dehider tool 10 having blades 12, 13 that rotate in opposite directions, it is contemplated that at least some of the teachings of the present invention may also have applicability to dehider tools having blades that oscillate. For example, a dehider tool could be created having blades in the general shape of regular convex polygons that oscillate relative to each other during operation.

While the invention has been specifically described in connection with specific embodiments thereof, it is to be understood that this is by way of illustration and not of limitation, and the scope of the appended claims should be construed as broadly as the prior art will permit.

What is claimed is:

1. A dehider tool comprising:
   first and second blades arranged to be in contact with each other, said blades being movable relative to each other on a common blade axis;
   a drive assembly for causing said blades to move relative to each other about said common blade axis; and
   at least one of said blades having a shape of a regular convex polygon.

2. The dehider tool according to claim 1, wherein both of said blades have a shape of a regular convex polygon.

3. The dehider tool according to claim 1, wherein both of said blades have a shape of a regular convex polygon having at least five sides.

4. The dehider tool according to claim 3, wherein said regular convex polygon has ten sides.

5. The dehider tool according to claim 3, wherein said blades each have a plurality of outer sides comprising sharp edges that define a continuous cutting edge extending around an outer periphery of each blade.

6. The dehider tool according to claim 5, wherein each of said blades comprises first and second planar sides, said first planar side comprises a flat surface adapted to be engaged by a corresponding flat surface of the other blade, and said outer sides are beveled on said second planar side to form said sharp edges.

7. The dehider tool according to claim 1, wherein both of said blades are substantially identical in size and shape.

8. The dehider tool according to claim 1, wherein said blades each have a center opening for coupling with a respective drive mechanism for rotating the blades about said common blade axis, and said center opening has a shape of a regular polygon.

9. The dehider tool according to claim 8, wherein said center opening has a shape of a regular convex polygon having at least five sides.

10. The dehider tool according to claim 1, wherein said blades are covered by a hard surface coating to extend a service life of said blades.

11. The dehider tool according to claim 10, wherein said hard surface coating is a hard chrome coating.

12. A dehider tool comprising:
   first and second blades arranged to be in contact with each other, said blades being movable relative to each other on a common blade axis;
   a drive assembly for causing said blades to move relative to each other about said common blade axis;
   each of said blades having a shape of a regular convex polygon having at least five sides;

wherein said blades each have a plurality of outer sides comprising sharp edges that define a continuous cutting edge extending around an outer periphery of each blade; and wherein said blades are arranged to be rotatably driven in a non-oscillating manner in opposite directions relative to each other about said common blade axis by said drive assembly.

13. The dehider tool according to claim 12, wherein said drive assembly comprises a pneumatic motor coupled to said blades by respective drive belts and belt pulleys for rotatably driving said blades in opposite directions about said common blade axis.

14. The dehider tool according to claim 13, wherein each of said belt pulleys is coupled to a respective one of said blades by a respective blade holder that fits into a center opening of the blade.

15. The dehider tool according to claim 14, further comprising a housing in which said blades and said drive assembly are mounted, first and second support spindles mounted in said housing for supporting said blades for rotation about said common blade axis, first and second thrust bearings arranged between said housing and said belt pulleys, and needle bearings arranged between said belt pulleys and said support spindles to provide smooth, high speed rotation of said blades.

16. A blade for a dehider tool, comprising:
a planar structure having a shape of a regular convex polygon with a plurality of outer sides, said plurality of outer sides comprising sharp edges that extend around an outer periphery of said blade.

17. The blade according to claim 16, wherein said regular convex polygon has at least five sides.

18. The blade according to claim 16, wherein said regular convex polygon is a decagon.

19. The blade according to claim 16, further comprising an opening extending through a center of said planar structure for receiving a drive mechanism for rotating said blade about a center axis, said opening having a shape of a regular polygon with at least five sides.

20. The blade according to claim 16, wherein said blade is covered by a hard surface coating to extend a service life of said blade.

21. The blade according to claim 20, wherein said hard surface coating is a hard chrome coating.

22. The blade according to claim 16, wherein said blade comprises first and second planar sides, said first planar side comprising a flat surface, and said outer sides being beveled on said second planar side to form said sharp edges.

* * * * *